United States Patent [19]

Sakaue

[11] Patent Number: 4,972,702
[45] Date of Patent: Nov. 27, 1990

[54] INTAKE AIR QUANTITY MEASURING APPARATUS

[75] Inventor: Yasunori Sakaue, Nagoya, Japan

[73] Assignee: Aisan Kogyo Kabushiki Kaisha, Obu, Japan

[21] Appl. No.: 401,129

[22] Filed: Sep. 1, 1989

[30] Foreign Application Priority Data

Sep. 2, 1988 [JP] Japan .................. 63-220730

[51] Int. Cl.$^5$ .......................... G01M 15/00
[52] U.S. Cl. .................. 73/118.2; 73/204.18
[58] Field of Search ............ 73/118.2, 204.18, 204.11; 123/494

[56] References Cited

FOREIGN PATENT DOCUMENTS 53-17069  6/1978  Japan .
57-22563  2/1982  Japan .
58-6416   1/1983  Japan .
60-230019 11/1985 Japan .
62-177416 8/1987  Japan .
1489874  10/1977 United Kingdom ............ 73/204.18

OTHER PUBLICATIONS

SAE Technical Paper No. 880560, Feb. 29–Mar. 4, 1988.

Primary Examiner—Jerry W. Myracle
Attorney, Agent, or Firm—Burns, Doane, Swecker & Mathis

[57] ABSTRACT

The invention is directed to an arrangement for measuring intake air quantity and producing an output signal with a slow approach to the final value of the signal effectively compensated. A measuring bridge senses a flow speed of the intake air and a measuring circuit provides a first signal in response to the flow speed. A differentiator differentiates the first signal and provides a second signal. An adder receives the first and second signals, and adds the latter to the former to produce the output signals. The arrangement may be provided with a limiter which limits an input or an output of the differentiator to a predetermined value.

9 Claims, 6 Drawing Sheets

INTAKE AIR QUANTITY MEASURING APPARATUS

BACKGROUND OF THE INVENTION

1. Field of the Invention

The present invention relates to an intake air quantity measuring apparatus, and more particularly to an apparatus for measuring a quantity of the intake air which flows into an intake air duct of an internal combustion engine.

2. Description of the Related Art

For measuring a quantity of the intake air supplied to an internal combustion engine, various air quantity measuring devices have been employed. In the prior devices, an intake air temperature sensing element and a flow speed sensing element are disposed in an intake air duct with planes of the elements parallel to the flow of the intake air, as disclosed in Japanese Patent Laid-Open Publication No. 60-230019, for example. Both elements comprise heat sensing resistors which form a bridge circuit with fixed resistors. In parallel with the flow speed sensing element, there is provided a heating resistor which heats up the heat sensing resistor of the flow speed sensing element to a higher temperature than that of the intake air temperature sensing element by a predetermined temperature difference. Then, the heating current supplied to the heating resistor is regulated in response to the temperature of the heat sensing resistor of the flow speed sensing element, which temperature is changed in response to the quantity of heat transferred to the intake air, so as to maintain the predetermined temperature difference. Consequently, the flow speed of the intake air is measured through the heating current, and the quantity of the intake air is determined by the flow speed.

The above-described intake air quantity measuring device is of a so-called indirect heating type. A device of the so-called self-heating type is also known, as disclosed in Japanese Patent Laid-Open Publication No. 62-177416. Further, there is disclosed a hot film sensor element which incorporates all the resistors including the heating resistor, in pages 105 to 109 of "SAE Technical Paper Series" 880560, published by Society of Automotive Engineers, Inc. in 1988. Therein, it is indicated that the response time of thermal air flow meters, due to a step change of the air flow rate, has two separate phases, i.e., a quick rise with a steep gradient up to about 70% of the final value, followed by a slow, asymtotic creep. In order to avoid this slow approach to the final value causing a significant error, it is proposed to extend the size of the heating resistor beyond that of the sensing resistor to obtain a guard heater effect.

The above-described meter is the device of the indirect heating type with the improved heating resistor, so that the proposed improvement is not applicable to the device of the self-heating type. Further, the improvement is made mechanically to the sensing element in view of the heat transfer therein, so that manufacturing cost of the sensing element will be high to obtain the guard heater effect constantly.

SUMMARY OF THE INVENTION

It is, therefore, an object of the present invention to provide an intake air quantity measuring apparatus which produces an output signal representing a quantity of intake air, with a delayed approach to the final value of the signal effectively compensated.

It is another object of the present invention to provide an intake air quantity measuring apparatus which includes differentiating means and adding means for producing an output signal with appropriate response times at both a leading edge and a trailing edge of the signal.

It is a further object of the present invention to provide an intake air quantity measuring apparatus which includes limiting means for limiting an input or an output of the differentiating means to avoid a predetermined level which may occur due to rapid change of quantity of the intake air.

In accomplishing these and other objects, an intake air quantity measuring apparatus includes measuring means for sensing a flow speed of intake air passing therethrough and providing a first signal in response to the flow speed of the intake air, differentiating means for differentiating the first signal fed from the measuring means and providing a second signal, and adding means for receiving the first signal and the second signal, and adding the second signal to the first signal to provide an output signal representing a quantity of the intake air.

The intake air quantity measuring apparatus may further include limiting means for limiting at least one of the first signal and the second signal to a predetermined level.

Preferably, the intake air quantity measuring apparatus includes a measuring bridge which senses a flow speed of intake air and provides an unbalanced voltage output in response thereto, and which forms a Wheatstone bridge with resistors including a flow speed sensing resistor having an ohmic value varying in response to change in temperature depending upon the flow speed of the intake air, and an intake air temperature sensing resistor having an ohmic value varying depending upon change in temperature of the intake air. A measuring circuit is connected to the measuring bridge and provides a first signal in response to the unbalanced voltage output. A limiter is connected to the measuring circuit and limits the first signal fed from the measuring circuit to a predetermined level. The limiter includes a zener diode which is connected in parallel with the measuring circuit. A differentiator is connected to the limiter and differentiates the first signal fed from the measuring circuit through the limiter and provides a second signal. The differentiator includes a capacitor which is connected to the limiter and a resistor which is connected to the capacitor. Further, an adder is connected to the differentiator. The adder receives the first signal and the second signal, and adds the second signal to the first signal to provide an output signal representing quantity of the intake air.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
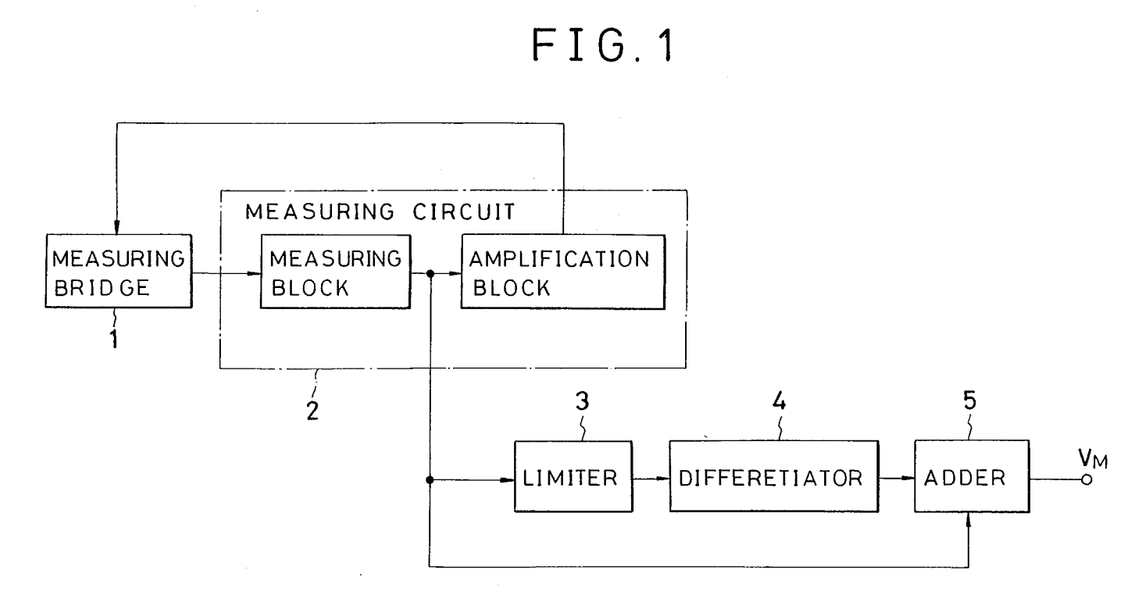
FIG. 1 is an overall block diagram illustrating an intake air quantity measuring apparatus according to the present invention.
Figure 2:
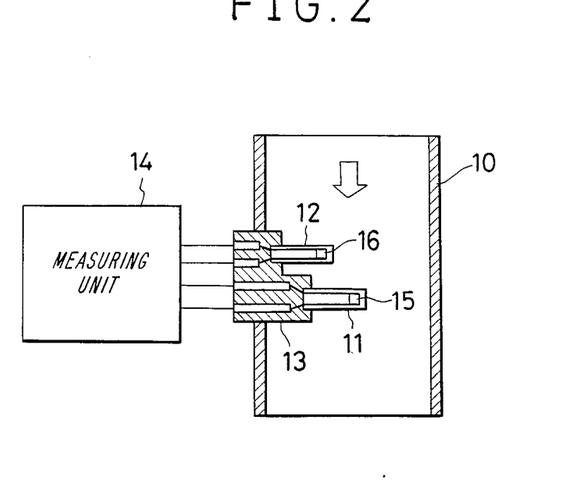
FIG. 2 is a sectional view of the intake air quantity measuring apparatus fixed to an intake duct.

Referring to FIG. 2, an engine intake duct 10 has mounted thereon a flow speed sensing element 11 (hereinafter, simply referred to as speed sensing element (11 having a self-heating flow speed sensing resistor 15 (hereinafter, simply referred to as speed sensing resistor 15), and an intake air temperature sensing element 12 (hereinafter, simply referred to as temperature sensing element 12) having an intake air temperature sensing resistor 16 (hereinafter, simply referred to as temperature sensing resistor 16). These resistors 15, 16 are connected to a measuring unit 14 to form an electrical circuit, a block diagram of which is shown in FIG. 1. A broad arrow in FIG. 2 indicates the direction of an intake air flow.

The speed sensing element 11 comprises a flat base plate and the speed sensing resistor 15 is a thin film heat sensing resistor fixed on the planar surface of the base plate. More specifically, a thin film heat sensing resistor made of platinum or the like is deposited on the base plate, which is made from ceramic, silicon, etc., in the form of a flat plate and on which a film of an insulator such as silicon dioxide is formed. Leads made of gold or the like are also deposited on the base plate and electrically connected to an end portion of the heat sensing resistor. As to the temperature sensing element 12, the temperature sensing resistor 16 is a thin film heat sensing resistor made of platinum or the like and leads made of gold or the like are deposited on the base plate, in the same manner as described above.

The speed sensing element 11 and the temperature sensing element 12 are mounted on a sensor holder 13 which is secured to the intake duct with a surface of the sensing elements 11, 12 parallel to the air flow. That is, both of the speed sensing resistor 15 and the temperature sensing resistor 16 are disposed on a plane parallel to the air flow. These sensing resistors 15, 16 are electrically connected to a measuring unit 14 through a pair of leads, respectively. Further, each of these sensing resistors 15, 16 has a large temperature coefficient with a linear characteristic, and each ohmic value is determined to be R15<<R16, in which R15 represents the ohmic value of the speed sensing resistor 15 and R16 represents that of the temperature sensing resistor 16.

Referring to FIG. 1, the measuring unit 14 comprises a measuring bridge 1 which embodies the principle of the Wheatstone bridge by means of an arrangement of resistors including the speed sensing resistor 15 and the temperature sensing resistor 16. The measuring bridge 1 is connected to a measuring circuit 2 which comprises a measuring block for producing an unbalanced voltage output and an amplification block for amplifying the unbalanced output signal and heating up the speed sensing resistor 15 so as to hold the measuring bridge 1 in a balanced state. The measuring circuit 2 is connected through a limiter 3 to a differentiator 4, whereby the output signal of the measuring circuit 2 is limited up to a predetermined level and differentiated thereafter. The differentiator 4 and the measuring circuit 2 are connected to an adder 5 which adds the output of the differentiator 4 to the output of the measuring circuit 2.

Figure 3:
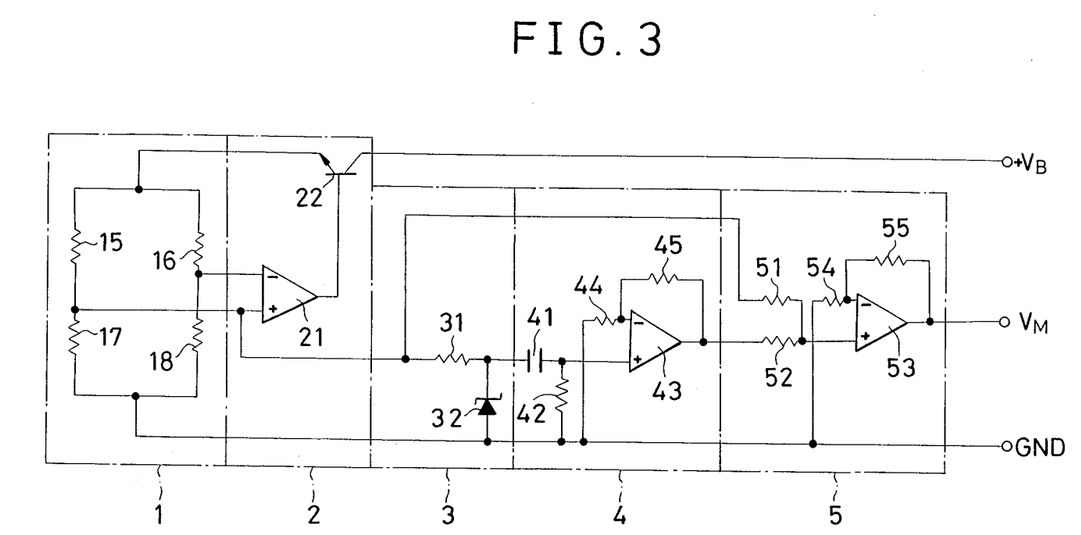
FIG. 3 is circuit diagram of an embodiment of the intake air quantity measuring apparatus.

A complete circuit diagram of the system embodying the present invention is shown in FIG. 3 wherein like reference numerals denote like parts shown in FIGS. 1 and 2. The measuring bridge 1 comprises two branches connected to each other in parallel, one of the branches including the speed sensing resistor 15 and fixed resistor 17 connected thereto in series, and the other of the branches including the temperature sensing resistor 16 and a fixed resistor 18 connected thereto in series. A point between the speed sensing resistor 15 and the fixed resistor 17 is connected to the noninverting input terminal (+) of an operational amplifier 21, whereas a point between the temperature sensing resistor 16 and the fixed resistor 18 is connected to the inverting input terminal (−) of the operational amplifier 21. The output terminal of the operational amplifier 21 is connected to the base of a transistor 22 for controlling a supply current fed to the measuring bridge 1, the emitter of which is connected to a point between the speed sensing resistor 15 and the temperature sensing resistor 16, and the collector of which is connected to a power source ($+V_B$). A point between the fixed resistor 17 and the fixed resistor 18 is grounded (GND).

As the ohmic value of the speed sensing resistor 15 is smaller than that of the temperature sensing resistor 16, the former is fed with larger current than the latter and, consequently, heated when the electrical current is supplied to the measuring bridge 1 by the power source ($+V_B$). Since the temperature of the speed sensing resistor 15 is higher than that of the temperature sensing resistor 16 by a predetermined value in the case where both of their ambient temperatures are the same, the ohmic values of the fixed resistors 17, 18 are determined in such a manner that the measuring bridge 1 is balanced when the temperature of the speed sensing resistor 15 exceeds the temperature of the intake air by a predetermined temperature difference $\Delta T_0$. The point between the speed sensing resistor 15 and the resistor 17, which is connected to the noninverting terminal of the operational amplifier 21, is also connected to a resistor 31 in the limiter 3 and a resistor 31 in the adder 5, so that the output signal of the measuring circuit 2 is fed to those resistors 31 and 51.

The limiter 3 comprises the resistor 31 and zener diode 32 connected thereto, so that the upper limit is preset for the output of the measuring circuit 2, or the unbalanced voltage, which is provided to the differentiator 4. The differentiator 4 comprises a capacitor 41 which is connected to the resistor 31 and the zener diode 32, and a resistor 42 which is connected to the capacitor 41 and grounded. These are connected to the adder 5 through an operational amplifier 43 which functions as a buffer with resistors 44, 45, and the output terminal of which is connected to a resistor 52 of the adder 5. The adder 5 comprises an operational amplifier 53, the noninverting terminal of which is connected to the aforementioned resistors 51, 52. Its inverting terminal is connected to a point between a resistor 54 which is grounded and a resistor 55 which is connected to the output terminal of the operational amplifier 53 from which the output signal ($V_M$) is produced.

The operation of the present embodiment will now be described. When the intake air is not introduced into the intake duct 10, the measuring bridge 1 is in equilibrium in the case where the temperature of the speed sensing resistor 15 is higher than that detected at the temperature sensing resistor 16 by the predetermined temperature difference $\Delta T_0$.

When the intake air is introduced into the intake duct 10, the speed sensing resistor 15 is unable to maintain the temperature difference $\Delta T_0$ due to heat transfer from the speed sensing resistor 15 to the intake air. Accordingly, in order to maintain the temperature difference $\Delta T_0$, the speed sensing resistor 15 must be supplied with current which is responsive to the speed of the intake air. Namely, the higher the speed of the intake air is, the more current is supplied. In other words, where the current supplied to the speed sensing resistor 15 for maintaining the temperature difference $\Delta T_0$ is increased, the speed of the intake air is high and therefore the air quantity is large.

When the temperature of the speed sensing resistor 15 decreases so that it is unable to maintain the temperature difference $\Delta T_0$, its ohmic value decreases. Consequently, the measuring bridge 1 becomes unbalanced, so that the noninverting input terminal of the operational amplifier 21 is at a high level, and a high level output signal is produced to operate the transistor 22, through which the current is supplied from the source ($+V_B$) to the measuring bridge 1. Then, the speed sensing resistor 15 is heated up, until the measuring bridge 1 is in equilibrium and the temperature difference $\Delta T_0$ is obtained. Accordingly, the output of the measuring circuit 2 responds to the speed of the intake air, and therefore represents the quantity of the intake air.

Figure 4A:
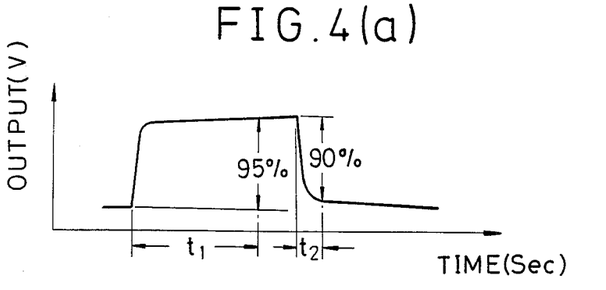
FIGS. 4(a), 4(b) and 4(c) show the waveforms of the outputs from the measuring circuit, the differentiator and the adder in FIG. 3.
Figure 4B:
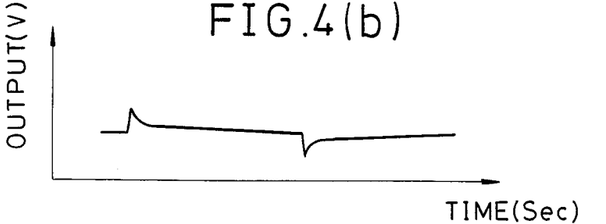
Figure 4C:
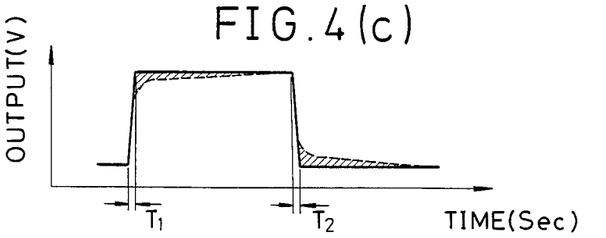

The output of the measuring circuit 2 indicates a waveform as shown in FIG. 4(a) which shows quick rise with a steep gradient at the leading edge and a slow approach to the final value thereafter. Accordingly, the rise time $t_1$ up to 95% of the final value of the output is long, and the response time $t_2$ down to 90% of the final value at the trailing edge is long as well. The output of the measuring circuit 2 is fed to the adder 5 and also fed to the differentiator 4 through the limiter 3. Then, the differentiated output is added to the output fed to the adder 5 from the measuring circuit 2. At the adder 5, the output of the differentiator 4, as shown in FIG. 4(b), is added to the output of the measuring circuit 2 as shown in FIG. 4(a), so that the output as shown in FIG. 4(c) is produced. That is, a transition of a slow approach to the final value in the output of the measuring circuit 2 is compensated by the output of the differentiator 4 as indicated by hatching in FIG. 4(c). As a result, both the response time $T_1$ at the leading edge and the response time $T_2$ at the trailing edge becomes much shorter than the response times $t_1$ and $t_2$ in FIG. 4(a), respectively, so that the output ($V_M$) of the adder 5 having a short response time is produced.

Figure 5:
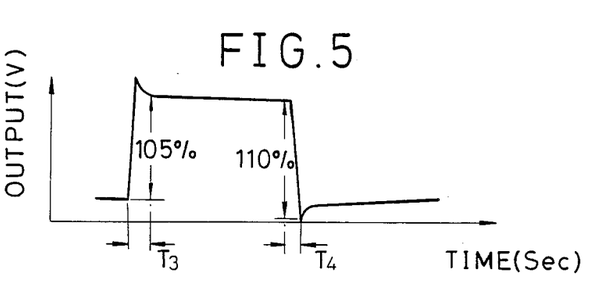
FIG. 5 shows a waveform of an output from the differentiator in the absence of the limiter of FIG. 3.

In the case where the change in quantity of the intake air is rapid, the output of the differentiator 4 is increased to cause a predetermined level to be exceeded as shown in FIG. 5, whereby the response times $T_3$ and $T_4$ at the leading edge and the trailing edge are lengthened. The transition of the slow approach to the final value is formed due to the heat transfer from the speed sensing resistor 15 to a mounting thereof which is caused by temperature difference between the speed sensing resistor 15 and the intake air, and the transition may be considered almost constant irrespective of the change in quantity of the intake air. Therefore, there is provided an upper limit for the output of the measuring circuit 2 transmitted to the differentiator 4 through the limiter 3 to provide an appropriate compensation against change in quantity of the intake air. From the foregoing, the stable final output with a short response time as shown in FIG. 4(c) is produced in the present embodiment, while the output as shown in FIG. 4(a) is used as the final output in the prior art.

Figure 6:
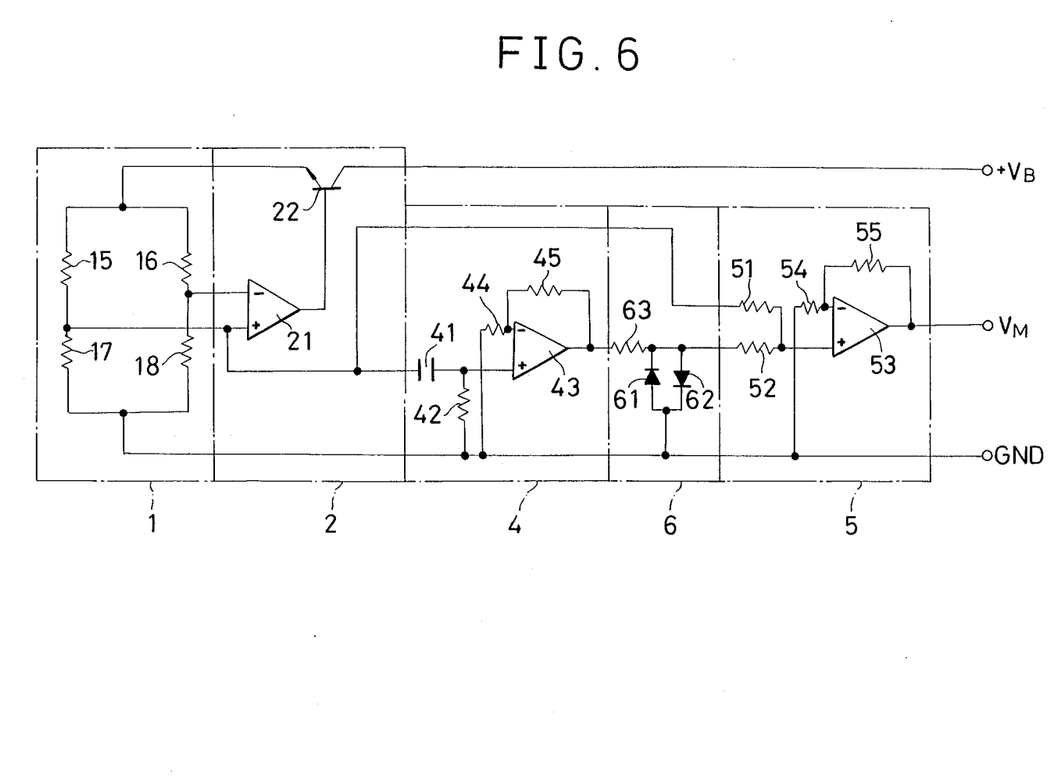
FIG. 6 is a circuit diagram of another embodiment of the intake air quantity measuring apparatus.

FIG. 6 shows another embodiment of the present invention, wherein the limiter 3 in FIG. 3 is eliminated and replaced by the limiter 6 at the output side of the differentiator 4, and wherein the remaining parts are the same as those in FIG. 3 and like reference numerals in FIG. 6 denote like parts in FIG. 3, so that description thereof will be omitted. The limiter 6 comprises a pair of diodes 61 and 62 connected to the output terminal of the operational amplifier through a resistor 63 as shown in FIG. 6. The limiter 6 provides an upper limit to the output of the differentiator 4.

Figure 7A:
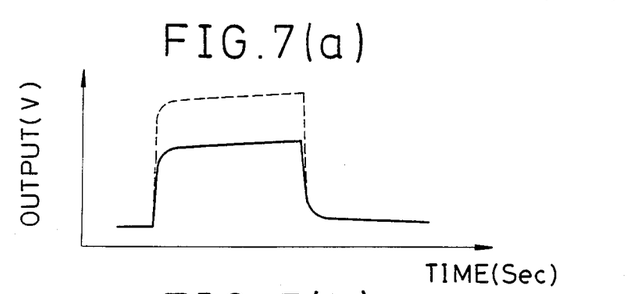
FIGS. 7(a), 7(b) and 7(c) show the waveforms of the outputs from the measuring circuit, the differentiator and the adder in FIG. 6.
Figure 7B:
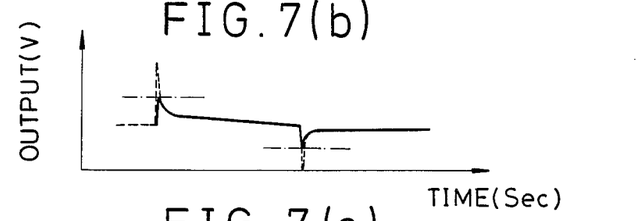
Figure 7C:
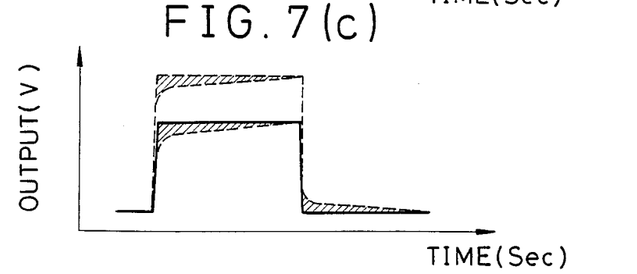
Figure 8:
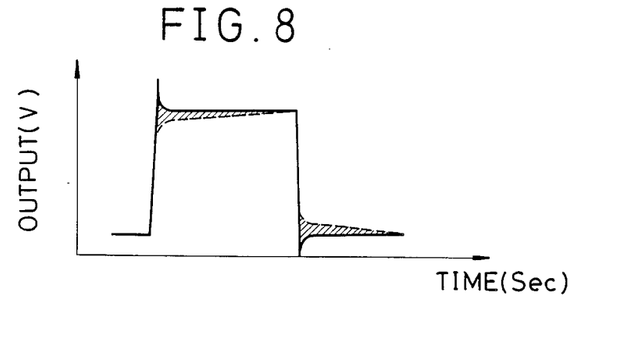
FIG. 8 shows a waveform of an output from the differentiator in the absence of the limiter of FIG. 6.

In the case where the change in quantity of the intake air is rapid, so that the output of the measuring circuit 2 is changed rapidly from a solid line to a phantom line in FIG. 7(a), for example, the differentiated output of the differentiator 4 will be that of a phantom line in FIG. 7(b). If this differentiated output is added to the output of the measuring circuit 2 at the adder 5, the hatching portion shown in FIG. 8 is added to the output thereby to cause a predetermined level to be exceeded. In the embodiment shown in FIG. 6, however, the upper and lower level of the output of the differentiator 4 are limited to predetermined values, respectively. That is, the output is formed between one-dot chain lines as shown in FIG. 7(b) in a solid waveform. Consequently, the output ($V_M$) of the adder 5 is regulated to be a signal having short response times at both leading edge and trailing edge with the hatching portion compensated as shown in FIG. 7(c). Therefore, the predetermined level is not exceeded, even if the output of the differentiator 4 changes rapidly to that of a waveform indicated by a phantom line in FIG. 7(c) due to change in quantity of the intake air. When a noise signal is introduced to cause an output with a quick rise at the differentiator 4, that signal is limited by the limiter 6 to prevent any defect to the output ($V_M$) of the adder 5.

It should be apparent to one skilled in the art that the above-described embodiment is merely illustrative of but a few of the many possible specific embodiments of the present invention. For example, in the above-described embodiments, the speed sensing element of the self-heating type is employed, whereas that of so-called indirect heating type with a heating resistor disposed in its vicinity may be employed. Numerous and various other arrangements can be readily devised by those skilled in the art without departing from the spirit and scope of the invention as defined in the following claims.

What is claimed is:

1. An apparatus for measuring intake air quantity comprising:
    measuring means for sensing a flow speed of intake air passing through an intake air duct and providing a first signal in response to the flow speed of said intake air;
    differentiating means for differentiating said first signal fed from said measuring means and providing a second signal;

limiting means for limiting at least one of said first signal and said second signal to a predetermined level; and adding means for receiving said first signal and said second signal, and adding said second signal to said first signal to provide an output signal representing a quantity of said intake air.

2. An apparatus for measuring intake air quantity as set forth in claim 1, wherein said measuring means includes a measuring bridge for sensing the flow speed of said intake air and providing an unbalanced voltage output in response thereto, and a measuring circuit connected to said measuring bridge for providing said first signal in response to said unbalanced voltage output.

3. An apparatus for measuring intake air quantity as set forth in claim 2, wherein said measuring bridge forms a Wheatstone bridge with resistors including a flow speed sensing resistor having an ohmic value varying in response to change in temperature thereof depending upon the flow speed of said intake air, and an intake air temperature sensing resistor having an ohmic value varying depending upon change in temperature of said intake air.

4. An apparatus for measuring intake air quantity as set forth in claim 3, further comprising limiting means for limiting said first signal fed from said measuring circuit to a predetermined level.

5. An apparatus for measuring intake air quantity as set forth in claim 4, wherein said limiting means comprises a limiter including a zener diode connected in parallel with said measuring circuit.

6. An apparatus for measuring intake air quantity as set forth in claim 3, wherein said differentiating means comprises a differentiator including a capacitor connected to said measuring circuit and a resistor connected to said capacitor.

7. An apparatus for measuring intake air quantity as set forth in claim 6, further comprising limiting means for limiting said second signal fed from said differentiator to a predetermined level.

8. An apparatus for measuring intake air quantity as set forth in claim 7, wherein said limiting means comprises a limiter including a pair of diodes connected in parallel with said differentiator, one of said diodes being connected at a cathode thereof with said differentiator and the other of said diodes being connected at an anode thereof with said differentiator.

9. An apparatus for measuring intake air quantity comprising:

a measuring bridge for sensing a flow speed of intake air and providing an unbalanced voltage output in response thereto, said measuring bridge forming a Wheatstone bridge with resistors including a flow speed sensing resistor having an ohmic value varying in response to change in temperature thereof depending upon the flow speed of said intake air, and an intake air temperature sensing resistor having an ohmic value varying depending upon change in temperature of said intake air;

a measuring circuit connected to said measuring bridge for providing a first signal in response to said unbalanced voltage output;

a limiter connected to said measuring circuit for limiting said first signal fed from said measuring circuit to a predetermined level, said limiter including a zener diode connected in parallel with said measuring circuit;

a differentiator connected to said limiter for differentiating said first signal fed from said measuring circuit through said limiter and providing a second signal, said differentiator including a capacitor connected to said limiter and a resistor connected to said capacitor; and an adder connected to said differentiator for receiving said first signal and said second signal, and adding said second signal to said first signal to provide an output signal representing a quantity of said intake air.

* * * * *